United States Patent

Hara

(12) United States Patent
(10) Patent No.: US 7,636,024 B2
(45) Date of Patent: Dec. 22, 2009

(54) WIRELESS COMMUNICATION APPARATUS AND INFORMATION PROCESSING TERMINAL APPARATUS WITH A WIRELESS APPLICATION

(75) Inventor: Shinji Hara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1047 days.

(21) Appl. No.: 10/829,236

(22) Filed: Apr. 22, 2004

(65) Prior Publication Data

US 2004/0224652 A1    Nov. 11, 2004

(30) Foreign Application Priority Data

Apr. 24, 2003  (JP) .............................. 2003-119456
Feb. 18, 2004  (JP) .............................. 2004-042054

(51) Int. Cl.
*H01P 5/12*     (2006.01)
*H03H 7/46*    (2006.01)

(52) U.S. Cl. .......................... 333/126; 333/129; 333/132

(58) Field of Classification Search ................. 333/101, 333/103–107, 126–129, 132, 134; 455/78, 455/80, 82, 83

See application file for complete search history.

(56) References Cited

U.S. PATENT DOCUMENTS

2001/0053672 A1    12/2001  Masaki
2003/0060233 A1     3/2003  Masaki et al.

FOREIGN PATENT DOCUMENTS

| JP | 3-102922 A | 4/1991 |
|---|---|---|
| JP | 05-083155 | 4/1993 |
| JP | 5-160635 A | 6/1993 |
| JP | 6-38343 | 5/1994 |
| JP | 7-193423 A | 7/1995 |
| JP | 7-288488 A | 10/1995 |
| JP | 8-316870 A | 11/1996 |
| JP | 10-107728 | 4/1998 |
| JP | 10-303640 | 11/1998 |
| JP | 11-098048 | 4/1999 |
| JP | 11-098051 | 4/1999 |
| JP | 2001-077720 | 3/2001 |
| JP | 2001-274723 A | 10/2001 |
| JP | 2002-232319 | 8/2002 |
| JP | 2002-325050 | 11/2002 |

OTHER PUBLICATIONS

Transistor Gijutsu Jul. 2001 (Published by Sharp Corporation Development Group Engineering Information Center) pp. 214-226, vol. 38-7, Jul. 1, 2001.

*Primary Examiner*—Benny Lee
*Assistant Examiner*—Kimberly E Glenn
(74) *Attorney, Agent, or Firm*—Birch, Stewart, Kolasch & Birch, LLP

(57) ABSTRACT

A wireless communication apparatus is made up of a transmission circuit block including an antenna that is laid out such that the transmission lines, i.e., the sum of the distance connecting respective circuit blocks between an output terminal of the transmission power amplifier to an input/output terminal of the antenna is shorter than the transmission line, i.e., the sum of the distance connecting respective circuit blocks between an input terminal of a transmission power amplifier and an output terminal of a RFIC disposed at a preceding stage of the transmission power amplifier. This arrangement realizes a wireless communications apparatus ensuring improvement of overall performance of the wireless application without reducing the total transmission loss or improving the performance of individual circuits.

35 Claims, 8 Drawing Sheets ly, FIG. 6 illustrates the case where the antenna is disposed on the wireless apparatus substrate.

WIRELESS COMMUNICATION APPARATUS AND INFORMATION PROCESSING TERMINAL APPARATUS WITH A WIRELESS APPLICATION

This Nonprovisional application claims priority under 35 U.S.C. § 119(a) on Patent Application No. 2003/119456 filed in Japan on Apr. 24, 2003, and No. 2004/042054 filed in Japan on Feb. 18, 2004, and the entire contents of which are hereby incorporated by reference.

FIELD OF THE INVENTION

The present invention relates to a wireless communication apparatus and an information processing terminal apparatus with a wireless application, each of which includes an antenna. The present invention particularly relates to a layout of a circuit block in the wireless communication apparatus in relation to the antenna.

BACKGROUND OF THE INVENTION

FIGS. 5 and 6 each illustrate an example of a general arrangement of a high-frequency portion of a circuit block in a wireless communication apparatus. FIG. 5 illustrates an example of a receiver device of a TV (Television), and FIG. 6 illustrates an example of a wireless LAN (Local Area Network) card. Note that, those figures illustrate only the portions relates to the present invention for ease of explanation.

As shown in these figures, in a conventional structure of a wireless communication apparatus, the whole circuit or a portion corresponding to high-frequency circuit is formed on a single substrate, and the input/output terminal of the high-frequency circuit is connected to the antenna via a cable or a transmission line. With this structure, the distance of the cable or the transmission line is longer than the connection distance between the respective blocks in the high-frequency circuit.

As one example, FIG. 5 shows a general TV image receiver in which a Yagi antenna 101 and a tuner RF (Radio Frequency) unit 103 are connected via so-called a feeder line of several meters, which is shown as a cable 102 in the figure. The tuner RF (Radio Frequency) unit 103 includes a band pass filter 105, a low-noise amplifier 107, and a mixer 109, which are connected to one another via a 5 mm micro strip line 104, 106, 108 and 110, respectively.

Further, in the case of a wireless LAN card, as shown in FIG. 6, an antenna 209 is soldered to a wireless LAN card substrate 201 as well as a high-frequency circuit; however, an antenna 209 and a band pass filter 207, which is the closest circuit to the antenna 209, are generally connected to a micro strip line 210 of several centimeters of 50Ω. The RFIC 203 connected to a baseband IC 202, a transmission power amplifier 205, a low-noise amplifier 213, a switch 211 and a band pass filter 207 are connected to one another via 5 mm micro strip lines 204, 214, 206, 212 and 208, respectively.

This structure is based on the fact that a high-frequency circuit block may be stored inside a TV image receiver, in a card-slot of a personal computer, or in a housing of the TV set, but the antenna section is preferably used in a free space, i.e., without obstacle objects around, in terms of obtaining good sensitivity, so that the antenna section tends to be away from the circuit part.

Further, even when stored in a housing on the same substrate, the high-frequency circuit block is generally covered with a shield casing so as to prevent unwanted radiation. For this reason, the distance between the antenna and the high-frequency circuit block is normally longer than the connection distance between other blocks.

Referring again to FIGS. 5 and 6, in which FIG. 5 illustrates the case where the antenna is away from the main body, and FIG. 6 illustrates the case where the antenna is disposed on the wireless apparatus substrate.

Here, FIG. 7 shows an alternative in which the antenna and a part of the wireless apparatus are stored in the same housing, which is separated from the main body of the wireless apparatus. This structure is used for a satellite broadcast receiver device, and deals with ultra high frequency band of 12 GHz, thus requiring temporary conversion of 12 GHz wireless frequency into 1 GHz intermediate frequency band. For this function, this structure has an individual down converter section, which is provided as a circuit block.

Further, because of the characteristic of satellite broadcast receiving, a parabola antenna 303, which is a kind of open antenna, is used instead of a linear antenna, and therefore, the structure requires a certain volume of a down converter feed bone 304 which is supported by a feed bone supporter 307. In this structure, a down converter feed bone 304 may also be used as a housing of the down converter.

For these reasons, it is a general way that the substrate where the down converter is formed is unified to the down converter feed bone 304, and is placed in the parabola antenna 303 in the vicinity of a focal point of a reflection mirror 306 supported by a parabola antenna brace 305. then, the down converter (not shown) of the down converter feed bone 304 converts a signal of 12 GHz (wireless frequency) into a signal of 1 GHz (intermediate frequency) causing less transmission loss. The converted signal is then inputted to an indoor satellite broadcast receiver tuner 301 by a coaxial cable 302 of several meters.

In the down converter feed bone 304 uses wiring formed in a receiver circuit structure for dealing with ultra high frequency. Therefore, there are some difficulties for regulating the connection distance between the respective circuit blocks.

Note that, prior art to be referred for the present invention may be, for example, Japanese Laid-Open Patent Application Tokukaihei 07-288488/1995 (published on Oct. 31, 1995), Tokukai 2001-274723/2001 (published on Oct. 5, 2001), Tokukaihei 05-160635/1993 (published on Jun. 25, 1993), Tokukaihei 07-193423/1995 (published on Jul. 28, 1995), Tokukaihei 08-316870/1995 (published on Nov. 29, 1996), Tokukaihei 03-102922/1991 (published on Apr. 30, 1991), and a magazine called "hardware for brand-new wireless LAN system (transistor technology July issue, 2001)".

Incidentally, with recent development of silicon (Si) integrated circuit which becomes now compatible with high frequency wave, a silicon RFIC (Radio Frequency Integrated Circuit), which had dealt with only intermediate frequency band, has become compatible with wireless frequency.

Accordingly, in many of wireless systems of several GHz or lower GHz, a down converter or an up converter is no longer included as an individual block.

Further, in prior art, the performance of the apparatus has been increased by improving performance of a power amplifier handling wireless frequency, or a low-noise amplifier, which are the closest active circuit to the antenna, and by improving performance of the respective circuit blocks, for example, by way of reducing transmission loss of wireless frequency band filter.

However, in a conventional layout of a wireless communication apparatus, such improvements of the power amplifier and the low-noise amplifier have not been fully reflected in the apparatus.

SUMMARY OF THE INVENTION

An object of the present invention is to provide a wireless communications apparatus, and an information processing terminal apparatus with a wireless application ensuring improvement of overall performance of the wireless application without reducing the total transmission loss or improving the performance of individual circuits.

In order to attain the foregoing object, the wireless communications apparatus according to the present invention includes a wireless frequency circuit block with a specific layout of an active circuit closest to the antenna with respect to the other circuit blocks as detailed below. Note that, typically, the active circuit closest to the antenna is a power-amplifier in case of the transmission system, and is a low-noise amplifier in case of the reception system.

An wireless communications apparatus according to the present invention includes a transmission circuit block including an antenna and a plurality of active circuits, wherein: the transmission circuit block is laid out so that a combined length of transmission lines connecting circuit blocks between an output terminal of an active circuit placed at an immediately-preceding-stage of the antenna and an input terminal of the antenna is shorter than a combined length of transmission lines connecting circuit blocks between an input terminal of the active circuit at the immediately-preceding-stage of the antenna and an output terminal of an active circuit at a preceding-stage of the active circuit at the immediately-preceding-stage of the antenna. The active circuit here refers to an amplifier or a mixer, and excludes a passive circuit with an active element such as a switch using MESFET (Metal Semiconductor Field Effect Transistor).

For example, the current consumption is greater when the loss is on the output side of the active circuit closer to the antenna than when it is on the input side. Further, in a system that requires linearity, the linearity of the system generally deteriorates as the output power of the active circuit is increased. Thus, in view of giving the same output power at the antenna terminal, the loss on the output side deteriorates the linearity of the system. This can be prevented by reducing the length of the transmission line as much as possible on the output side of the active circuit.

In this point of view, the present invention specifies an arrangement of the transmission circuit block so that a combined length of transmission lines connecting circuit blocks between an output terminal of an active circuit placed at an immediately-preceding-stage of the antenna and an input terminal of the antenna is shorter than a combined length of transmission lines connecting circuit blocks between an input terminal of the active circuit at the immediately-preceding-stage of the antenna and an output terminal of an active circuit at a preceding-stage of the active circuit at the immediately-preceding-stage of the antenna.

In other words, the circuit blocks on the wireless communications apparatus are laid out such that the combined length of the transmission lines connecting the respective circuits from the antenna to the active circuit closest to the antenna is shorter than the length of the transmission line connecting the active circuit closest to the antenna to the next active circuit in the direction opposite to the antenna.

Thus, with this wireless communications apparatus, the overall performance of the wireless application can be improved not by reducing the total transmission loss as attained by reducing the total size of the apparatus, or by improving the performance of individual circuits, but by reducing the length of the transmission lines connecting the antenna to the output terminal of the active circuit disposed on the immediately-preceding-stage of the antenna.

Further, a wireless communications apparatus according to the present invention includes a reception circuit block including an antenna and a plurality of active circuits, wherein: the reception circuit block is laid out so that a combined length of transmission lines connecting circuit blocks between an output terminal of the antenna and an input terminal of an active circuit placed at an immediately-following-stage of the antenna is shorter than a combined length of transmission lines connecting circuit blocks between an output terminal of the active circuit at the immediately-following-stage of the antenna and an input terminal of an active circuit at a following-stage of the active circuit at the immediately-following-stage of the antenna.

Also in the case of the reception system, the distance between the input terminal of the low-noise amplifier and the output terminal of the antenna is decreased as much as possible to reduce the input loss. This is effective as suggested by the theorem of noise estimation in a multi-stage amplifier.

In this point of view, the present invention specifies an arrangement of the reception circuit block so that a combined length of transmission lines connecting circuit blocks between an output terminal of the antenna and an input terminal of an active circuit placed at an immediately-following-stage of the antenna is shorter than a combined length of transmission lines connecting circuit blocks between an output terminal of the active circuit at the immediately-following-stage of the antenna and an input terminal of an active circuit at a following-stage of the active circuit at the immediately-following-stage of the antenna.

In other words, the circuit blocks on the wireless communications apparatus are laid out such that the combined length of the transmission lines connecting the respective circuits from the antenna to the active circuit closest to the antenna is shorter than the length of the transmission line connecting the active circuit closest to the antenna to the next active circuit in the direction opposite to the antenna.

Thus, with this wireless communications apparatus, the overall performance of the wireless application can be improved not by reducing the total transmission loss as attained by reducing the total size of the apparatus, or by improving the performance of individual circuits, but by reducing the length of the transmission lines connecting the antenna to the input terminal of the active circuit disposed on the immediately-following-stage of the antenna.

Further, an information processing terminal apparatus with a wireless application according to the present invention is divided into a wireless application section and an antenna section physically separated from each other and includes the foregoing wireless communications apparatuses wherein the antenna constitutes a front end section together with an active circuit at the immediately preceding/following stage of the antenna, the front end section being separated from the wireless application section and being placed either on a same substrate on which the antenna section is provided, or in the vicinity of the antenna section.

This layout offers improved performance enough to make up the transmission loss due to the use of cables. That is, when this structure uses a circuit block having the same performance as a conventional circuit block, it is possible to improve system performance as much as an amount of the transmission loss caused by the cables. Further, in the case where this structure uses a similar antenna output system to the conventional system, it is possible to realize an information processing terminal apparatus with a wireless application, which can offer higher linearity, lower noise (higher sensitivity) and low power consumption, compared to the conventional apparatus.

For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
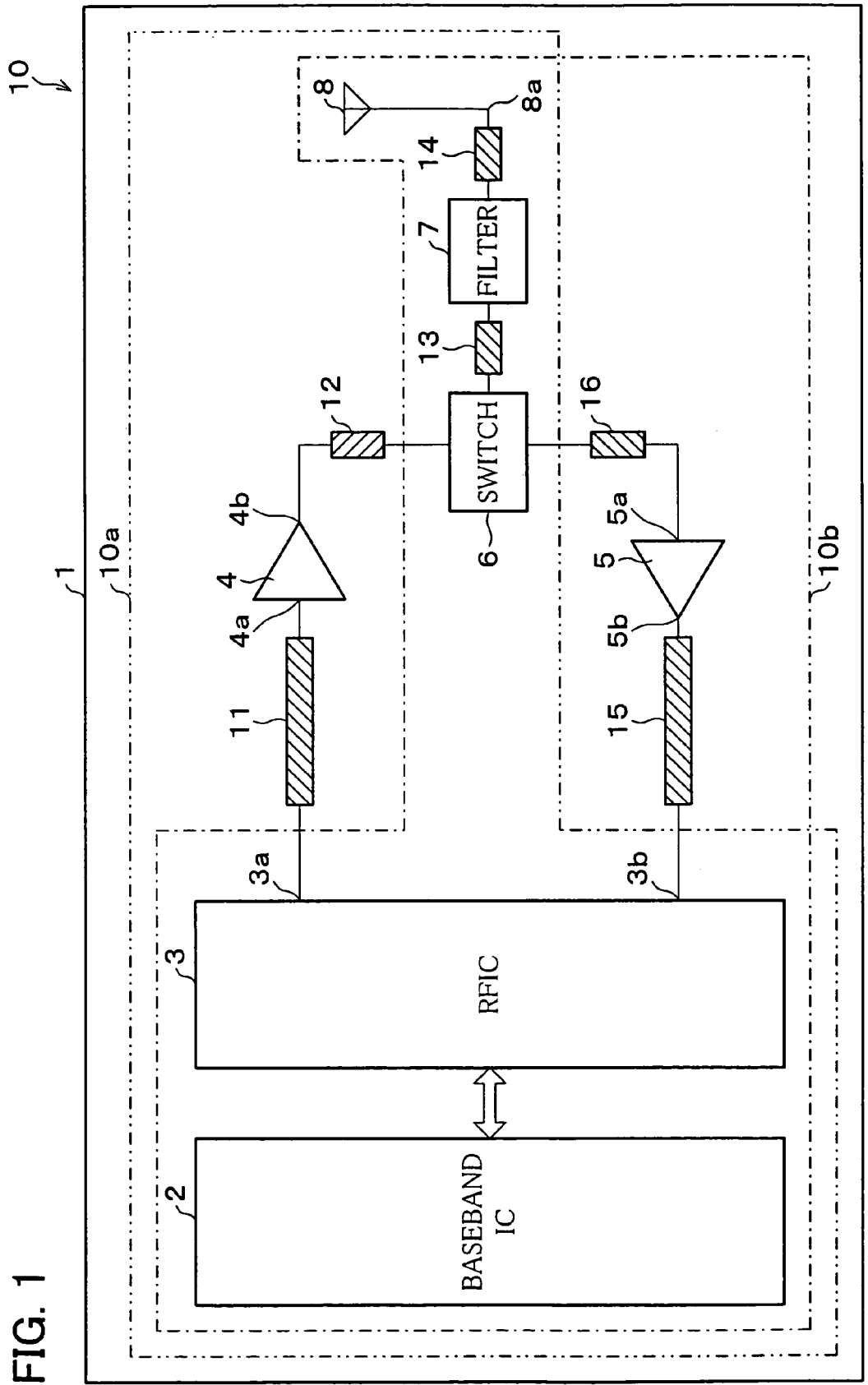
FIG. 1 is a block diagram illustrating one embodiment of a wireless LAN card according to the present invention.

Referring to FIG. 1, one embodiment of the present invention is described below. While the invention is susceptible to various modifications and alternative forms, specific embodiments thereof will be described below by way of a wireless LAN card and a wireless LAN apparatus as exemplary forms of a wireless communications apparatus according to the present invention. It should be understood, however, that they are not intended to limit the invention to the particular forms disclosed, but on the contrary, the invention is also applicable to other apparatuses, including a mobile phone, for example.

FIG. 1 illustrates a wireless LAN card 10 as a wireless communications apparatus of the present embodiment. As shown in FIG. 1, the wireless LAN card 10 includes a baseband IC 2, a RFIC 3, a transmission power amplifier 4, a low-noise amplifier 5, a transmission/reception switch 6, a band pass filter 7, and an antenna 8, which are all provided on a wireless LAN substrate 1. The antenna 8 is soldered on the wireless LAN substrate 1. In the present invention, the transmission power amplifier 4 and the low-noise amplifier 5 each serve as an active circuit on the immediately-preceding-stage of the antenna. The RFIC 3 serves as an active circuit on the former stage of the present invention.

The wireless LAN card 10 is divided into a transmission circuit block 10a and a reception circuit block 10b.

As indicated by the chain double-dashed line in FIG. 1, the transmission circuit block 10a includes the baseband IC 2, the RFIC 3, the transmission power amplifier 4, the transmission/reception switch 6, the band pass filter 7, and the antenna 8. Similarly, the reception circuit block 10b includes the antenna 8, the band pass filter 7, the transmission/reception switch 6, the low-noise amplifier 5, the RFIC 3, and the baseband IC 2, as indicated by the dashed line in FIG. 1.

These circuits are connected to one another by transmission lines 11 and 15, and transmission lines 12, 13, 14, and 16. For the transmission lines 11 and 15, a 30 mm micro strip line is used, for example. As for the transmission lines 12, 13, 14, and 16, each line is realized by a 5 mm micro strip line, for example.

In the present embodiment, the transmission/reception switch 6 is used to carry out switching between the transmission circuit block 10a or the reception circuit block 10b.

In the wireless LAN card 10 of the present embodiment, the transmission circuit block 10a including the antenna 8 has such a layout that the transmission line 11 connecting an input terminal 4a of the transmission power amplifier 4 to an output terminal 3a of the RFIC 3 disposed on the preceding stage of the transmission power amplifier 4 (the distance between the input terminal 4a to the output terminal 3a) is longer than the sum of the transmission lines 12, 13, and 14 connecting the respective circuit blocks (the distance from an output terminal 4b of the transmission power amplifier 4 to an input/output terminal 8a of the antenna 8).

Figure 6:
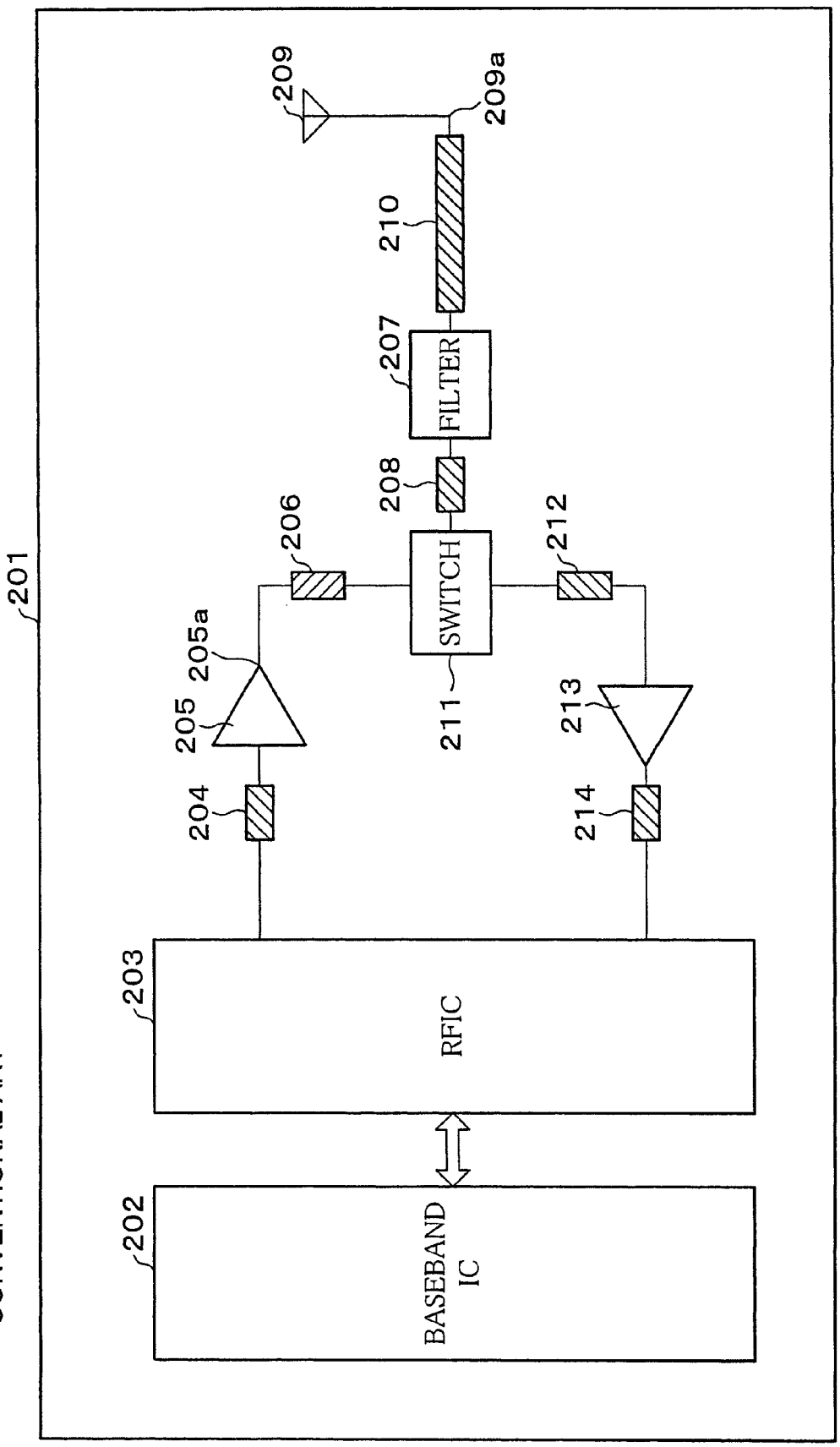
FIG. 6 is a block diagram illustrating a structure of a conventional wireless LAN card.
Figure 7:
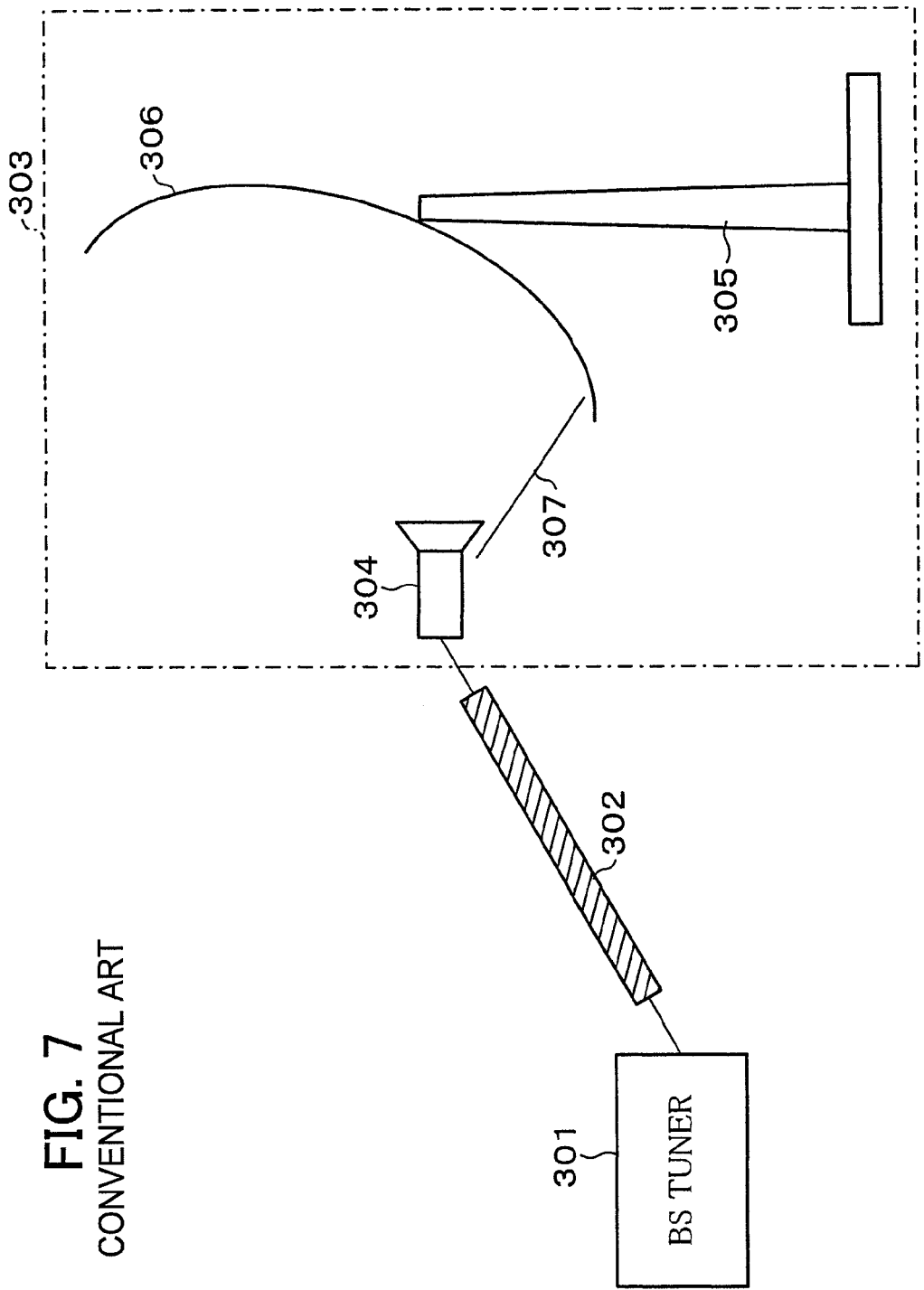
FIG. 7 is a block diagram illustrating a structure of a conventional satellite broadcast receiver device.

In this layout of the present embodiment, the total length of the transmission lines in the transmission circuit block is equal to that described with reference to FIG. 6 in conjunction with the BACKGROUND OF THE INVENTION section. More specifically, the total length of the transmission lines 204, 206, 208, and 210 illustrated in FIG. 6 is equal to the sum of the transmission lines 11, 12, 13, and 14 illustrated in FIG. 1.

However, the present embodiment differs from the prior art in that the total length of the transmission lines 206, 208, and 210 connecting the output terminal 205a of the power amplifier 205 to the input/output terminal 209a of the antenna 209 is reduced by 25 mm in the present embodiment. More specifically, the sum of the transmission lines 12, 13 and 14 shown in FIG. 1 is 25 mm shorter than the sum of the transmission lines 206, 208 and 210 shown in FIG. 6. In exchange, the sum of the transmission line 11 shown in FIG. 1 is 25 mm longer than the sum of the transmission line 204 shown in FIG. 6.

Similarly, the reception circuit block 10b including the antenna 8 has such a layout that the transmission line 15 connecting an output terminal 5b of the low-noise amplifier 5 to an input terminal 3b of the RFIC 3 disposed on the subsequent stage of the low-noise amplifier 5 (the distance from the output terminal 5b to the input terminal 3b) is longer than the sum of the transmission lines 16, 13, and 14 connecting the respective circuit blocks (the distance from an input terminal 5a of the low-noise amplifier 5 to the input/output terminal 8a of the antenna 8).

In the following, detailed description is made as to how the present embodiment reduces a loss incurred between the antenna 8 and the first active circuit (transmission power amplifier 4, low-noise amplifier 5).

The present embodiment improves overall performance of the wireless application not by reducing a total transmission loss as attained by reducing the total size of the apparatus, or by improving the performance of individual circuits, but by reducing the length of the transmission lines connecting the output terminal 4b of the transmission power amplifier 4 to the input/output terminal 8a of the antenna 8, and/or the length of the transmission lines connecting the input/output terminal 8a of the antenna 8 to the input terminal 5a of the low-noise amplifier 5.

For the sake of simplicity, a transmission system is assumed here that includes only the transmission power amplifier 4, a preamplifier, the antenna 8, and a transmission line with a loss of 1 dB, for example. In this transmission system, the antenna 8 requires an input power of 30 dBm.

The preamplifier consumes 5 mA in ideal class A operation. The transmission power amplifier 4 is a class AB amplifier, and has a gain of 30 dB in the vicinity of a desired output power. The transmission power amplifier 4 consumes 600 mA when the output power is 30 dBm, and consumes 700 mA when the output power is 31 dBm.

For example, when the transmission line is between the transmission power amplifier 4 and the preamplifier, the transmission power amplifier 4 requires an input power of 1 dBm. In this case, the preamplifier and the transmission power amplifier 4 consume 5 mA and 600 mA, respectively, making the current consumption of the transmission system 605 mA.

On the other hand, when the transmission line is on the output section of the transmission power amplifier, i.e., between the transmission power amplifier 4 and the antenna 8, the transmission power amplifier 4 requires an output power of 31 dB to make up for the 1 dB loss. In this case, the pre-amplifier and the transmission power amplifier 4 consume 5 mA and 700 mA, respectively, making the total current consumption of the transmission system 705 mA.

As this model shows, the current consumption is greater when the loss is on the output side of the transmission power amplifier 4 than when it is on the input side. Further, in a system that requires linearity, the linearity of the system generally deteriorates as the output power of the power amplifier is increased. Thus, in view of giving the same output power at the antenna terminal, the loss on the output side deteriorates the linearity of the system. This can be prevented by reducing the length of the transmission line as much as possible on the output side of the transmission power amplifier.

In the case of the reception system, the distance between the input terminal 5a of the low-noise amplifier 5 and the input/output terminal 8a of the antenna 8 is decreased as much as possible to reduce the input loss. This is effective as suggested by the theorem of noise estimation in a multi-stage amplifier.

Specifically, the circuit blocks of the wireless communications apparatus are laid out such that the combined length of the transmission lines connecting the respective circuits from the antenna 8 to the active circuit closest to the antenna 8 is shorter than the length of the transmission line connecting this active circuit to the next active circuit in the direction opposite to the antenna 8.

In the arrangement of the present embodiment, the total gain does not change in the transmission circuit block 10a and reception circuit block 10b. However, since the wireless LAN card 10 generally uses a wireless LAN substrate 1 made of a single FR-4 substrate, the present embodiment achieves a reduction of about 0.5 dB for the transmission loss between the antenna 8 to the first active circuit (transmission power amplifier 4, low-noise amplifier 5) provided on the same substrate, thereby improving performance of the wireless communications apparatus.

That is, in the wireless LAN substrate 1 of the present embodiment, the transmission circuit block 10a including the antenna 8 has such a layout that the length of the transmission line 11 connecting the input terminal 4a of the transmission power amplifier 4 disposed on the immediately-preceding-stage of the antenna 8 and the output terminal 3a of the RFIC 3 disposed on a preceding stage of the transmission power amplifier 4 is longer than the combined length of the transmission lines 12, 13, and 14 connecting the respective circuit blocks from the output terminal 4b of the transmission power amplifier 4 to the input/output terminal 8a of the antenna 8.

In other words, the circuit blocks on the wireless LAN card 10 are laid out such that the combined length of the transmission lines connecting the respective circuits from the antenna 8 to the transmission power amplifier 4 closest to the antenna 8 is shorter than the length of the transmission line connecting the transmission power amplifier 4 to the RFIC 3 as the next active circuit in the direction opposite to the antenna 8.

Thus, with the wireless LAN card 10, the overall performance of the wireless application can be improved not by reducing the total transmission loss as attained by reducing the total size of the apparatus, or by improving the performance of individual circuits, but by reducing the length of the transmission lines connecting the antenna 8 to the output terminal 4b of the transmission power amplifier 4 disposed on the immediately-preceding-stage of the antenna 8.

Further, the wireless LAN card 10 of the present embodiment is arranged so that the transmission power amplifier 4 placed on the immediately-preceding-stage of the antenna 8 functions as a power amplifier, thereby offering the effect of the present invention with the use of a general wireless communications apparatus.

Further, in the wireless LAN card 10 of the present embodiment, the transmission circuit block 10a including the antenna 8 has such a layout that the length of the transmission line 15 connecting the output terminal 5b of the low-noise amplifier 5 disposed on the immediately-preceding-stage of the antenna 8 and the input terminal 3b of the RFIC 3 disposed on the following-stage of the low-noise amplifier 5 is longer than the combined length of the transmission lines 16, 13, and 14 connecting the respective circuit blocks from the input terminal 5a of the low-noise amplifier 5 to the input/output terminal 8a of the antenna 8.

In other words, the circuit blocks on the wireless LAN card 10 are laid out such that the combined length of the transmission lines connecting the respective circuits from the antenna 8 to the low-noise amplifier 5 closest to the antenna 8 is shorter than the length of the transmission line connecting the low-noise amplifier 5 to the RFIC 3 as the next active circuit in the direction opposite to the antenna 8.

Thus, with the wireless LAN card 10, the overall performance of the wireless application can be improved not by reducing the total transmission loss as attained by reducing the total size of the apparatus, or by improving the performance of individual circuits, but by reducing the combined length of the transmission lines 16, 13 and 14 connecting the antenna 8 to the input terminal 5a of the low-noise amplifier 5 disposed on the immediately-preceding-stage of the antenna 8.

Further, the wireless LAN card 10 of the present embodiment is arranged so that an active circuit placed on the immediately-preceding-stage of the antenna 8 is the low-noise amplifier 5, thereby offering the effect of the present invention with the use of a general wireless communications apparatus.

Further, the wireless LAN card 10 is formed by combining the transmission circuit block 100a including the antenna 8 and the reception circuit block 10b including the antenna 8, and therefore the overall performances of both the transmission circuit block 10a and the reception circuit block 10b can be improved not by reducing the total transmission loss as attained by reducing the total size of the apparatus, or by improving the performance of individual circuits, but by reducing the length of the transmission line connecting the antenna to the output terminal of the active circuit disposed on the immediately-preceding-stage or immediately-following stage of the antenna.

Further, in the wireless LAN card 10 of the present embodiment, the antenna 8 is made of a linear antenna.

Therefore, it is possible to provide a wireless LAN card 10 including a linear antenna with superior overall performance of a wireless application without entirely improving performances of respective circuit elements or transmission loss.

Further, the wireless LAN card of the present embodiment may be arranged so that a length of the transmission lines connecting the respective circuits may be represented by a high-frequency transmission loss.

Further, it is possible to provide a wireless LAN card 10 with high linearity low noise, and low power consumption by reducing high-frequency transmission loss between the antenna 8 and the transmission power amplifier 4 or the low-noise amplifier 5. Namely, such a wireless LAN card 10 may be realized only with modification of layout.

Second Embodiment

Figure 2:
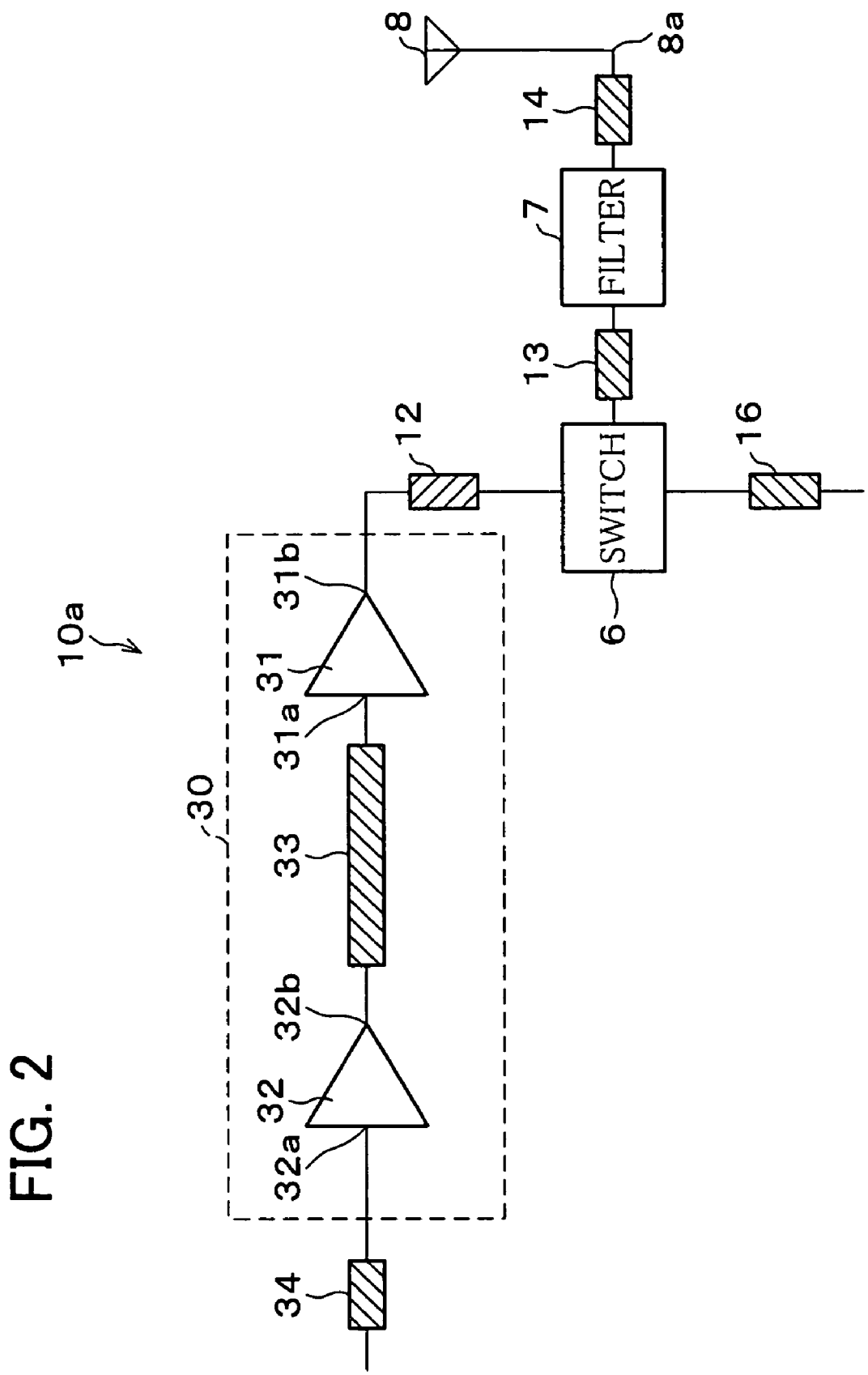
FIG. 2 is a block diagram illustrating another embodiment of the wireless LAN card according to the present invention, in which a transmission circuit block is formed as an active circuit block.

The following will explain another embodiment of the present invention with reference to FIG. 2. The structures other than those specifically explained in the present invention are identical to those described in the first embodiment. Therefore, for ease of explanation, materials having the equivalent functions as those shown in the drawings pertaining to the first embodiment above will be given the same reference symbols, and explanation thereof will be omitted here.

As shown in FIG. 2, the wireless LAN card 10 according to the present embodiment is different from that of the first embodiment in that the transmission power amplifier 4 is made of an active circuit block 30 that is constituted of a plurality of amplifiers, a postamplifier 31 and a preamplifier 32. Otherwise, the wireless LAN card 10 of the present embodiment is identical to that of the first embodiment.

Note that, FIG. 2 illustrates only the transmission circuit block 10a of the wireless LAN card 10. Further, in the active circuit block 30, the postamplifier 31 and the preamplifier 32 are connected by a transmission line 33 made of a 20 mm micro strip line.

The present embodiment is so arranged as to satisfy L2>L1>L3, where L1 expresses the combined length of the transmission lines 12, 13 and 14, L2 expresses the length of the transmission line 33, and L3 expresses the length of the transmission line 34.

If assuming that the active circuit block 30 corresponds to the transmission power amplifier 4 of the first embodiment, the present embodiment apparently fails to satisfy the condition: L1<L3.

However, as has been explained, the present invention concerns the length of the transmission line between the antenna 8 and the active circuit closest to the antenna 8. Accordingly, since the active circuit closest to the antenna 8 here is the postamplifier 31, the length difference between L1 and L2 are referred in the foregoing condition of the first embodiment. As can be seen, this layout satisfies L1<L2, and therefore the length of the transmission line 34 is not concerned.

As described, the wireless LAN card 10 of the present embodiment includes the active circuit block 30 constituted of a plurality of active circuits, i.e., the postamplifier 31 and the preamplifier 32, and placed on the immediately-preceding-stage of the antenna 8, wherein the combined length of the transmission lines 12, 13 and 14 connecting the respective circuits from the output terminal 31b of the active circuit block 30 to the input/output terminal 8a of the antenna 8 is shorter than the length of the transmission line 33 connecting the respective circuits between the input terminal 31a of the postamplifier 31 and the output terminal 32b of the preamplifier 32, which is the immediately preceding active circuit of the postamplifier 31.

With the concept of the present invention aimed at reducing the length of the transmission line as much as possible on the output side of the active circuit placed on the immediately-preceding-stage of the antenna, the wireless LAN card achieves improvement of the overall performance of the wireless application not by reducing the total transmission loss as attained by reducing the total size of the apparatus, or by improving the performance of individual circuits, but by reducing the combined length of the transmission lines 12, 13 and 14 connecting the antenna 8 to the output terminal 31b of the postamplifier 31 disposed on the immediately-preceding-stage of the antenna 8.

Note that, the present invention is not limited to the embodiments above, but may be altered within the scope of the claims. For example, the embodiment above describes the case where the transmission circuit block 10a includes the active circuit block 30. However, the present invention is not limited to this arrangement but may be arranged so that the reception circuit block 10b may also include the active circuit block 30.

This arrangement also provides the foregoing effect. That is, with the concept of the present invention aimed at reducing the length of the transmission line as much as possible on the output side of the active circuit placed immediately behind the antenna, the wireless LAN card achieves improvement of the overall performance of the wireless application not by reducing the total transmission loss as attained by reducing the total size of the apparatus, or by improving the performance of individual circuits, but by reducing the combined length of the transmission line connecting the antenna to the input terminal of the active circuit disposed immediately behind the antenna.

Third Embodiment

Figure 3:
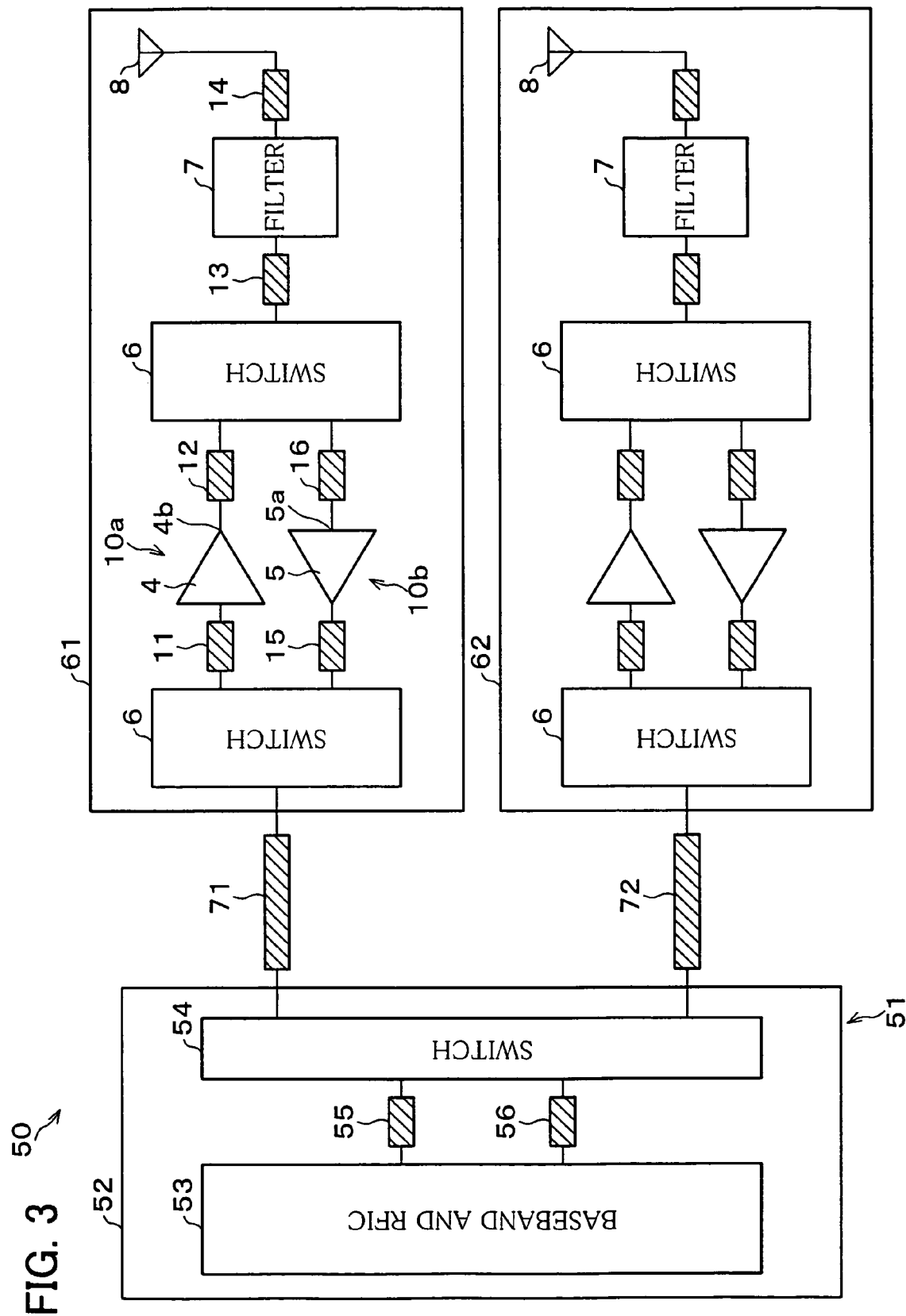
FIG. 3 is a block diagram illustrating still another embodiment of the present invention, which is a wireless LAN card in which a front end substrate and a wireless LAN main circuit body substrate are divided.

The following will explain still another embodiment of the present invention with reference to FIG. 3. The structures other than those specifically explained in the present invention are identical to those described in the first and second embodiments. Therefore, for ease of explanation, materials having the equivalent functions as those shown in the drawings pertaining to the first and second embodiments above will be given the same reference symbols, and explanation thereof will be omitted here.

As shown in FIG. 3, the wireless LAN apparatus 50 according to the present embodiment has a different structure from that of the first embodiment. Specifically, in this embodiment, the antenna 8 and a wireless LAN main circuit body 51 are not formed on the same substrate, but a front end substrate 61 where the antenna 8 is mounted and a wireless LAN main circuit body substrate 52 are connected via a 20 cm coaxial cable 71. Further, in order to obtain a diversity effect with two systems of antenna, a front end substrate 62 where another antenna 8 is mounted and a wireless LAN main circuit body substrate 52 are also connected via another 20 cm coaxial cable 72.

More specifically, in the present embodiment, the wireless LAN main circuit body 51 is made up of the wireless LAN main circuit body substrate 52 which mounts a baseband/RFIC 53 and a diversity switch 54. The baseband/RFIC 53 and the diversity switch 54 are connected via transmission lines 55 and 56, each of which are made of a 5 mm micro strip line, for example.

Further, as in the first embodiment, the front end substrate 61 includes a transmission power amplifier 4, a low-noise amplifier 5, a transmission/reception switch 6, a band pass filter 7, and an antenna 8, which are connected to one another via transmission lines 11, 15, 12, 16, 13 and 14, each of which are made of a 5 mm micro strip line. Further, in the present embodiment, another transmission/reception switch 6 is provided between the transmission lines 11, 15 made of a 5 mm micro strip line and the 20 cm coaxial cable 71.

Further, the front end substrate 62 has the same structure as that of the front end substrate 61.

As shown in the figure, the present embodiment provides the diversity switch 54 on each of the front end substrates 61 and 62 in order to use a single system of a high-frequency transmission line connecting the respective antennas 8 and the wireless LAN main circuit body 51. However, the present invention is not limited to this structure, but may be constituted, for example, of transmission/reception circuit blocks each constituted of two systems of transmission lines, and the transmission/reception switch 6 may be mounted not on the front end substrate 61 or 62 but on the wireless LAN main circuit body substrate 52.

Since the present embodiment uses 20 cm coaxial cables 71 and 72, if assuming that the transmission is carried out by power of 5 GHz using a Teflon® cable with a diameter of approximately 0.8 mm, the foregoing method of the present invention realizes 2 dB reduction of the transmission loss from the antenna 8 to the first-stage active circuit, i.e., the transmission power amplifier 4 and the low-noise amplifier 5.

As has been described, the wireless LAN apparatus 50 according to the present embodiment has the transmission circuit block 10a arranged so that the respective circuit blocks from the antenna 8 to the transmission power amplifier 4 positioned on the immediately-preceding-stage of the antenna 8 are all formed on the front end substrate 61 or 62 that is separated from the wireless LAN main circuit body substrate 52 which mounts the baseband/RFIC 53 positioned on the former-stage of the transmission power amplifier 4. With this arrangement, it is possible to easily reduce the connecting length between the antenna 8 and the output terminal 4b of the transmission power amplifier 4 placed on the immediately-preceding-stage of the antenna 8, thereby securely improving the overall performance of the wireless application of the wireless LAN apparatus 50.

Further, in the wireless LAN apparatus 50 according to the present embodiment, all of the respective circuit blocks from the antenna 8 to the transmission power amplifier 4 positioned on the immediately-preceding-stage of the antenna 8 are all formed on the same transmission circuit block 10a that is separated from the circuit block mounting the baseband/RFIC 53 positioned on the former-stage of the transmission power amplifier 4. With this arrangement, it is possible to easily reduce the connecting length between the antenna 8 and the output terminal 4b of the transmission power amplifier 4 placed on the immediately-preceding-stage of the antenna 8, thereby securely improving the overall performance of the wireless application of the wireless LAN apparatus 50.

Note that, this structure may be constituted either of the following ways: some of the respective circuit blocks between the antenna 8 and the transmission power amplifier 4 positioned on the immediately-preceding-stage of the antenna 8, for example, the transmission power amplifier 4 and the switch 6, are formed on one substrate separated from the wireless LAN main circuit body substrate 52 mounting the baseband/RFIC 53 that is positioned on the former-stage of the transmission power amplifier 4, and further, the band pass filter 7 and the antenna 8 are formed on another substrate separated from the wireless LAN main circuit body substrate 52; otherwise, the baseband/RFIC 53 is mounted as one circuit block, and the transmission power amplifier 4 and the switch 6 are formed as another circuit block, and the band pass filter 7 and the antenna 8 are formed as still another circuit block.

Further, in the wireless LAN apparatus 50 according to the present embodiment, all of the respective circuit blocks from the antenna 8 to the low-noise amplifier 5 immediately behind the antenna 8 are formed on the front end substrate 61 or 62 that is separated from the wireless LAN main circuit body substrate 52 which mounts the baseband/RFIC 53 positioned on the later-stage of the low-noise amplifier 5. With this arrangement, it is possible to easily reduce the connecting length between the antenna 8 and the input terminal 5a of the low-noise amplifier 5 placed on immediately behind the antenna 8, thereby securely improving the overall performance of the wireless application of the wireless LAN apparatus 50.

Further, the wireless LAN apparatus 50 according to the present embodiment is constituted by combination of the transmission circuit block 10a and the reception circuit block 10b, each of which includes the antenna 8.

In this view, the present embodiment provides a wireless LAN device 50 in which the transmission circuit block 10a and the reception circuit block 10b each include the antenna 8 are unified.

Note that, this structure may be constituted either of the following ways: some of the respective circuit blocks between the antenna 8 and the low-noise amplifier 5 positioned immediately behind the antenna 8, for example, the low-noise amplifier 5 and the switch 6, are formed on one substrate separated from the wireless LAN main circuit body substrate 52 mounting the baseband/RFIC 53 that is positioned on the later-stage of the low-noise amplifier 5, and further, the band pass filter 7 and the antenna 8 are formed on another substrate separated from the wireless LAN main circuit body substrate 52; otherwise, the baseband/RFIC 53 is mounted as one circuit block, and the low-noise amplifier 5 and the switch 6 are formed as another circuit block, and the band pass filter 7 and the antenna 8 are formed as still another circuit block.

Further, the wireless LAN device 50 according to the present embodiment includes the baseband/RFIC 53, which is a circuit block having such an arrangement that either an intermediate frequency circuit or a modulation/demodulation circuit, and a wireless frequency input-output circuit are provided on a single package or a single chip.

Accordingly, with provision of such a baseband/RFIC 53, it is possible to provide a wireless LAN device 50 with superior overall performance of the wireless communications apparatus without reducing the total transmission loss or improving the performance of individual circuits.

Fourth Embodiment

Figure 4:
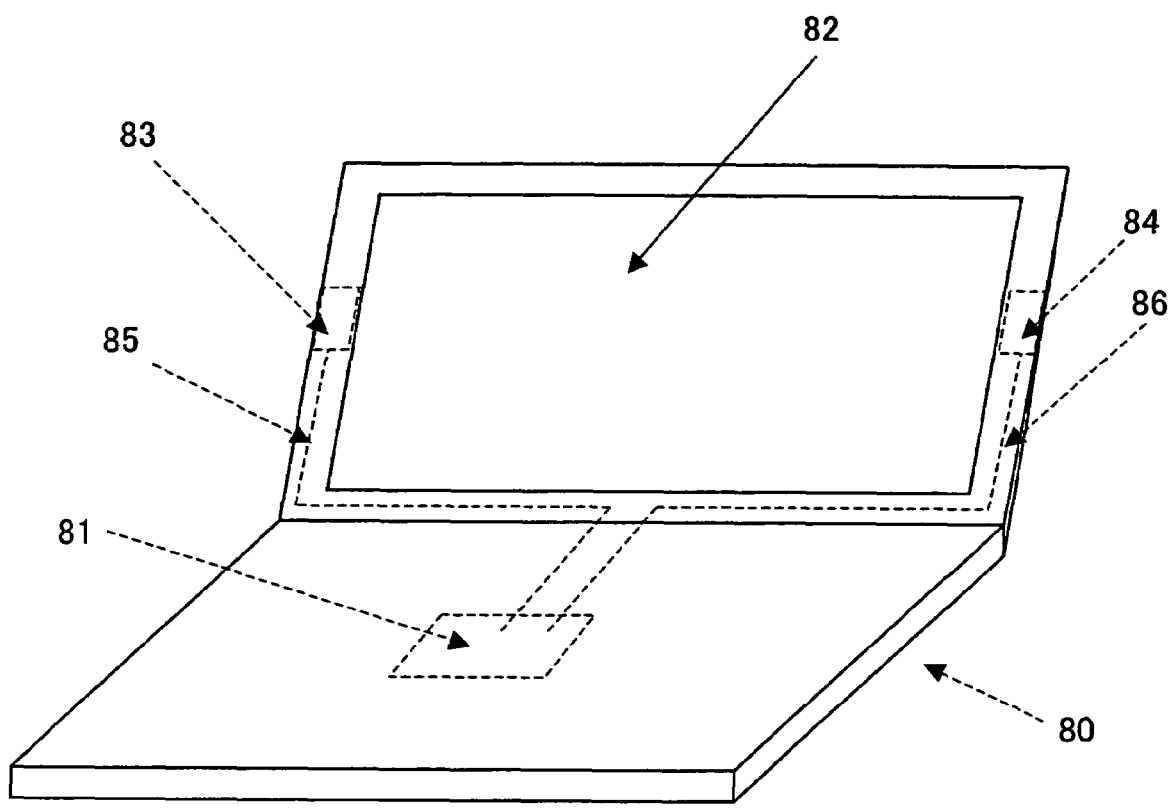
FIG. 4 is a perspective view illustrating a structure of a personal computer (PC) including the wireless LAN card of the present invention.
Figure 5:
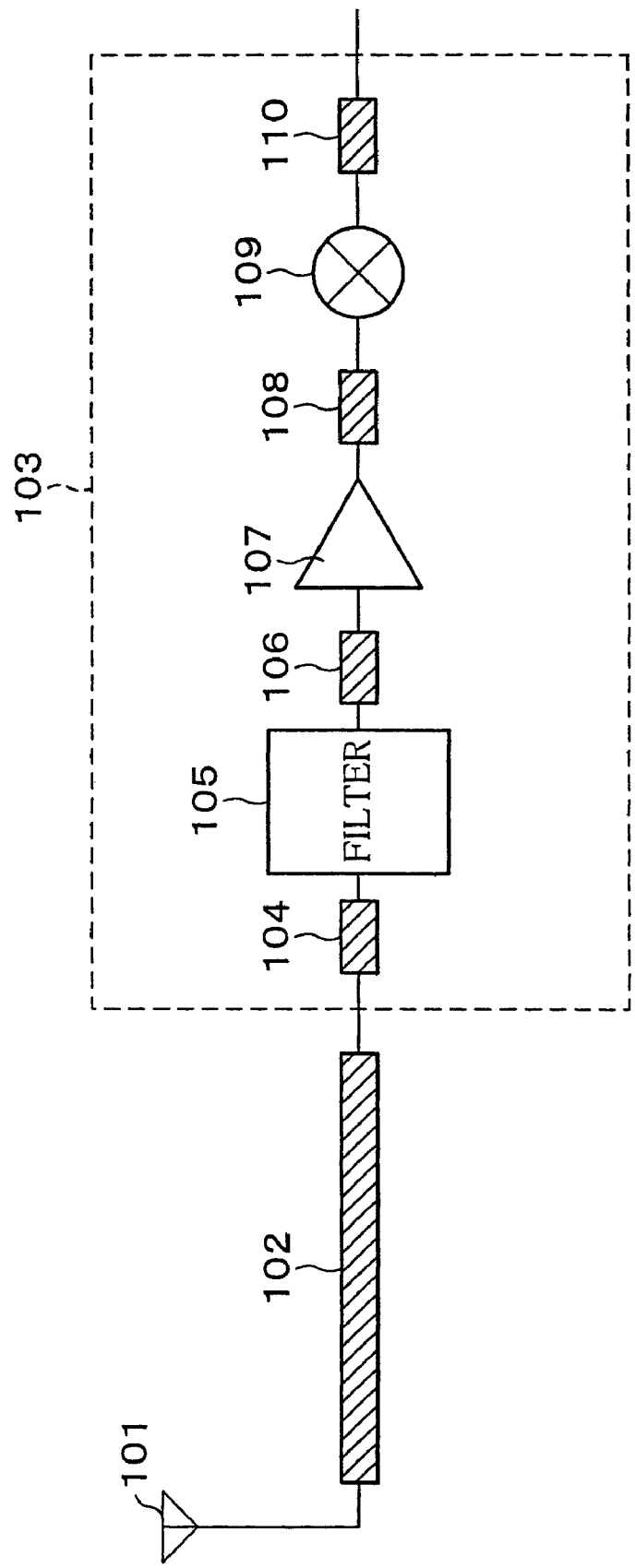
FIG. 5 is a block diagram illustrating a structure of a conventional TV receiver device.

The following will explain still another embodiment of the present invention with reference to FIG. 4. The structures other than those specifically explained in the present invention are identical to those described in the first through thirds embodiments. Therefore, for ease of explanation, materials having the equivalent functions as those shown in the drawings pertaining to the first through third embodiments above will be given the same reference symbols, and explanation thereof will be omitted here.

Figure 8:
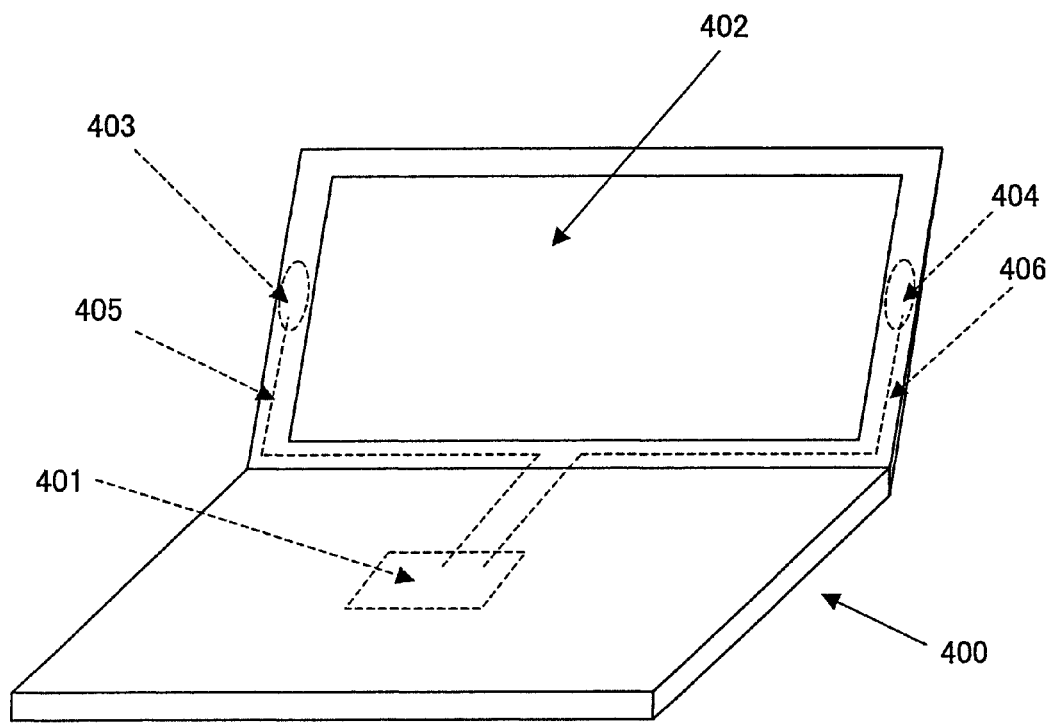
FIG. 8 is a perspective view illustrating a structure of a personal computer (PC) including a conventional wireless LAN card.

The present embodiment first refers to a conventional lap-top personal computer shown in FIG. 8, which includes a general wireless LAN function. As shown in FIG. 8, in this lap-top personal computer, a main PC body 400 includes a wireless LAN module 401, which is so-called a mini PCI, and antennas 403 and 404 on both sides of a liquid crystal display section 402, thus enabling diversity transmission/reception. The wireless LAN module 401 is connected to the antennas 403 and 404 by Teflon® cables 405 and 406, respectively.

However, this conventional lap-top PC requires Teflon® cables 405 and 406 with a length of 20 cm, and which causes 2 dB loss with respect to 5 GHz. Accordingly, in comparison with a structure in which the antennas 403 and 404 are included inside the wireless LAN module 401, the structure above causes 2 db loss in its output and noise factor. This prevents the wireless LAN module 401 from making full use of the original transmission distance and quality.

In view of this problem, FIG. 4 shows a lap-top personal computer (PC) as an example of an information processing terminal apparatus with a wireless application according to the present embodiment. This PC has such an arrangement that a main PC body 80 includes a wireless LAN module 81 not including a front end section, and front end modules 83 and 84 each including the antennas 8 on both sides of a liquid crystal display section 82 via Teflon® cables 85 and 86 each having a diameter of approximately 0.8 mm. Here, the front end modules 83 and 84 respectively have the same circuit layouts as those of the front end substrates 61 and 62 shown in FIG. 3, for example.

Here, the difference between this lap-top PC and the conventional lap-top shown in FIG. 8 can be clearly seen with the foregoing explanation of the structure. This lap-top PC of the present embodiment obtains improved performance enough to make up the transmission loss due to the use of the Teflon® cables 405 and 406. Further, in the case where this PC uses a similar antenna output system to the conventional PC, it is possible to realize an information processing terminal apparatus with a wireless application, which can offer higher linearity, lower noise (higher sensitivity) and low power consumption, compared to the conventional PC.

Note that, the present invention is not limited to the described structure of the present embodiment above, in which the front end modules 83 and 84 are provided on the same substrate as the mounting sections of the antennas 8, but may also be arranged so that the front end modules 83 and 84 are provided in the vicinity of the mounting sections of the antennas 8.

As described, a wireless communications apparatus according to the present invention includes a transmission circuit block including an antenna and a active circuit block made up of a plurality of active circuits, wherein the transmission circuit block is laid out so that a combined length of transmission lines connecting circuit blocks between an output terminal of the active circuit block and an input terminal of the antenna is shorter than a combined length of transmission lines connecting circuit blocks between an input terminal of a final-stage active circuit of the active circuit block and an output terminal of an active circuit at a preceding-stage of the active circuit at the final-stage of the active circuit block.

More specifically, the receiving sensitivity of the wireless communications apparatus depends on the circuit at the immediately-preceding-stage of the antenna; and therefore, in the case where the active circuit at the immediately-preceding-stage of the antenna is an active circuit block made up of a plurality of active circuits, the final-stage circuit of the active circuit block is concerned.

In this point of view, the apparatus of the present invention comprises a transmission circuit block including an antenna and a active circuit block made up of a plurality of active circuits, and is arranged so that the transmission circuit block is laid out so that a combined length of transmission lines connecting circuit blocks between an output terminal of the active circuit block and an input terminal of the antenna is shorter than a combined length of transmission lines connecting circuit blocks between an input terminal of a final-stage active circuit of the active circuit block and an output terminal of an active circuit at a preceding-stage of the active circuit at the final-stage of the active circuit block.

With the concept of the present invention aimed at reducing the length of the transmission line as much as possible on the output side of the active circuit at immediately-preceding-stage of the antenna, the wireless communications apparatus of the present invention achieves improvement of the overall performance of the wireless application not by reducing the total transmission loss as attained by reducing the total size of the apparatus, or by improving the performance of individual circuits, but by reducing the combined length of the transmission line connecting the antenna to the input terminal of the active circuit disposed at immediately-preceding-stage of the antenna.

The wireless communications apparatus according to the present invention is arranged so that the active circuit placed at the immediately-preceding-stage of the antenna is a power amplifier.

Therefore, the effect of the present invention can be obtained with the use of a general wireless communications apparatus.

Further, a wireless communications apparatus according to the present invention includes a reception circuit block including an antenna and an active circuit block made up of a plurality of active circuits, wherein the reception circuit block is laid out so that a combined length of transmission lines connecting circuit blocks between an output terminal of the antenna and an input terminal of the active circuit block is shorter than a combined length of transmission lines connecting circuit blocks between an output terminal of a first-stage active circuit of the active circuit block and an input terminal of a second-stage active circuit of the active circuit block.

Also in this case of a reception circuit block, the receiving sensitivity of the wireless communications apparatus depends on the circuit at the immediately-preceding-stage of the antenna; and therefore, in the case where the active circuit at the immediately-preceding-stage of the antenna is an active circuit block made up of a plurality of active circuits as with the case of the foregoing transmission circuit block, the first-stage circuit of the active circuit block is concerned.

In this point of view, the apparatus of the present invention including an active circuit block made up of a plurality of active circuits is laid out so that a combined length of transmission lines connecting circuit blocks between an output terminal of the antenna and an input terminal of the active circuit block is shorter than a combined length of transmission lines connecting circuit blocks between an output terminal of a first-stage active circuit of the active circuit block and an input terminal of a second-stage active circuit of the active circuit block.

With the concept of the present invention aimed at reducing the length of the transmission line as much as possible on the output side of the active circuit at immediately-preceding-stage of the antenna, the wireless communications apparatus of the present invention achieves improvement of the overall performance of the wireless application not by reducing the total transmission loss as attained by reducing the total size of the apparatus, or by improving the performance of individual circuits, but by reducing the combined length of the transmission line connecting the antenna to the input terminal of the active circuit disposed at immediately-preceding-stage of the antenna.

Further, the wireless communications apparatus according to the present invention is arranged so that the active circuit placed at the immediately-following-stage of the antenna is a low-noise amplifier.

Therefore, the effect of the present invention can be obtained with the use of a general wireless communications apparatus.

Further, the wireless communications apparatus according to the present invention is formed by combination of a wireless communications apparatus having the transmission circuit block and a wireless communications apparatus having the reception circuit block, each of which includes the antenna.

On this account, it is possible to achieve improvement of the overall performance of the wireless application for both the transmission circuit block and the reception circuit block each of which includes the antenna, not by reducing the total transmission loss as attained by reducing the total size of the apparatus, or by improving the performance of individual circuits, but by reducing the combined length of the transmission line connecting the antenna to the input terminal of the active circuit disposed at immediately-preceding-stage of the antenna.

Further, in the present invention, the wireless communications apparatus including the foregoing transmission circuit block having an antenna is arranged so that a part or entire of circuit blocks from the active circuit at the immediately-preceding stage of the antenna to the antenna are formed on a substrate different from a substrate on which the active circuit at the preceding-stage of the active circuit at the immediately-preceding-stage of the antenna is formed.

With this arrangement, it is possible to easily reduce the connecting length between the antenna and the output terminal of the active circuit placed at immediately-preceding-stage the antenna, thereby securely improving the overall performance of the wireless application of the wireless communications apparatus.

Further, in the present invention, the wireless communications apparatus including the foregoing transmission circuit block having an antenna is arranged so that a part or entire of circuit blocks from the active circuit at the immediately-preceding stage of the antenna to the antenna are formed as one circuit block different from a circuit block in which the active circuit at the preceding-stage of the active circuit at the immediately-preceding-stage of the antenna is formed.

With this arrangement, it is possible to easily reduce the connecting length between the antenna and the output terminal of the active circuit placed at immediately-preceding-stage the antenna, thereby securely improving the overall performance of the wireless application of the wireless communications apparatus.

Further, in the present invention, the wireless communications apparatus including the foregoing reception circuit block having an antenna is arranged so that a part or entire of circuit blocks from the antenna to the active circuit at the immediately-following stage of the antenna are formed on a substrate different from a substrate on which the active circuit at the following-stage of the active circuit at the immediately-following-stage of the antenna is formed.

With this arrangement, it is possible to easily reduce the connecting length between the antenna and the output terminal of the active circuit placed at immediately-following-stage the antenna, thereby securely improving the overall performance of the wireless application of the wireless communications apparatus.

Further, in the present invention, the wireless communications apparatus including the foregoing reception circuit block having an antenna is arranged so that a part or entire of circuit blocks from the antenna to the active circuit at the immediately-following stage of the antenna are formed as one circuit block different from a circuit block in which the active circuit at the following-stage of the active circuit at the immediately-following-stage of the antenna is formed.

With this arrangement, it is possible to easily reduce the connecting length between the antenna and the output terminal of the active circuit placed at immediately-following-stage the antenna, thereby securely improving the overall performance of the wireless application of the wireless communications apparatus.

Further, the wireless communications apparatus according to the present embodiment is constituted by combination of the foregoing transmission circuit block having an antenna that is laid out so that a part or entire of circuit blocks from the active circuit at the immediately-preceding stage of the antenna to the antenna are formed on a substrate different from a substrate on which the active circuit at the preceding-stage of the active circuit at the immediately-preceding-stage of the antenna is formed; and the foregoing reception circuit block having an antenna that is laid out so that a part or entire of circuit blocks from the antenna to the active circuit at the immediately-following stage of the antenna are formed on a substrate different from a substrate on which the active circuit at the following-stage of the active circuit at the immediately-following-stage of the antenna is formed.

With this arrangement, it is possible to provide a wireless communications apparatus in which the invention of a wireless communications apparatus including the foregoing transmission circuit block with an antenna and the invention of a wireless communications apparatus including the foregoing reception circuit block with an antenna are combined together.

The foregoing wireless communications apparatus according to the present invention is arranged so that one of the circuit blocks is made up of either an intermediate frequency circuit or a modulation/demodulation circuit, and a wireless frequency input-output circuit which are provided on a single package or on a single chip.

With this arrangement, the present invention may be adopted for a wireless communications apparatus in which one of the circuit blocks is made up of either an intermediate frequency circuit or a modulation/demodulation circuit, and a wireless frequency input-output circuit which are provided on a single package or on a single chip.

The wireless communications apparatus according to the present invention is arranged so that the antenna is a linear antenna.

With this arrangement, the present invention may be adopted for a wireless communications apparatus using a linear antenna.

The wireless communications apparatus according to the present invention is arranged so that a length of the transmission lines connecting circuit blocks is represented by a high-frequency transmission loss.

With this arrangement, it is possible to provide a wireless communication apparatus with high linearity, low noise, and low power consumption by reducing high-frequency transmission loss between the antenna and the active circuit at the immediately-preceding-stage of the antenna. Namely, such a wireless communications apparatus may be realized only with modification of layout.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A wireless communications apparatus, comprising: a transmission circuit device including an antenna and a plurality of transmission active circuits, wherein the plurality of transmission active circuits includes at least a transmission amplifier circuit and a first transmission active circuit,
wherein:
the transmission circuit device is laid out so that a combined length of transmission lines connecting circuit members, which includes at least a first circuit member and a second circuit member, in a first block circuit between an output terminal of the transmission amplifier circuit placed at an immediately-preceding-stage of the antenna and an input terminal of the antenna is shorter than a combined length of transmission lines connecting between an input terminal of the transmission amplifier circuit at the immediately-preceding-stage of the antenna and an output terminal of the first transmission active circuit at a preceding-stage of the transmission amplifier circuit at the immediately-preceding-stage of the antenna.

2. The wireless communications apparatus as set forth in claim 1, wherein:
the transmission amplifier circuit is a power amplifier.

3. The wireless communications apparatus as set forth in claim 1, wherein,
the transmission circuit device is laid out so that a part or entire of the first block circuit from the transmission amplifier circuit at the immediately-preceding stage of the antenna to the antenna are formed on a substrate different from a substrate on which the first transmission active circuit at the preceding-stage of the transmission amplifier circuit at the immediately-preceding-stage of the antenna is formed.

4. The wireless communications apparatus as set forth in claim 1, wherein,
the transmission circuit device is laid out so that a part or entire of the first block circuit is formed as one circuit group different from a circuit group in which the first transmission active circuit is formed.

5. The wireless communications apparatus as set forth in claim 1, wherein,
the first transmission active circuit is made up of either an intermediate frequency circuit or a modulation/demodulation circuit, and a wireless frequency input-output circuit which are provided on a single package or on a single chip.

6. The wireless communications apparatus as set forth in claim 1, wherein,
the antenna is a linear antenna.

7. The wireless communications apparatus as set forth in claim 1, wherein,
the combined lengths of the transmission lines are represented by high-frequency transmission loss.

8. A wireless communications apparatus, comprising:
a transmission circuit device including an antenna and a transmission active circuit block made up of a plurality of active circuits wherein the plurality of active circuits includes at least a final-stage transmission amplifier circuit and a next-to-last-stage transmission active circuit placed at an immediately-preceding-stage of the final-stage transmission amplifier circuit,
wherein:
the transmission circuit device is laid out so that a combined length of transmission lines connecting circuit members, which includes at least a first circuit member and a second circuit member, in a first block circuit between an output terminal of the transmission active circuit block and an input terminal of the antenna is shorter than a combined length of transmission lines connecting between an input terminal of the final-stage transmission amplifier circuit and an output terminal of the next-to-last-stage transmission active circuit in the transmission active circuit block.

9. The wireless communications apparatus as set forth in claim 8, wherein:
the transmission amplifier circuit is a power amplifier.

10. The wireless communications apparatus as set forth in claim 8, wherein,
the plurality of transmission active circuits further includes a second transmission active circuit at a preceding stage of the transmission active circuit block,
the transmission circuit device is laid out so that a part or entire of the first block circuit from the final-stage transmission amplifier circuit of the transmission active circuit block to the antenna is formed on a substrate different from a substrate on which the second transmission active circuit at the preceding-stage of the transmission active circuit block is formed.

11. The wireless communications apparatus as set forth in claim 8, wherein,
the plurality of transmission active circuits further includes a second transmission active circuit at a preceding stage of the transmission active circuit block,
the transmission circuit device is laid out so that a part or entire of the first block circuit is formed as one circuit group different from a circuit group in which the second transmission active circuit at preceding-stage of the transmission active circuit block is formed.

12. A wireless communications apparatus, comprising:
a reception circuit device including an antenna and a plurality of reception active circuits, wherein the plurality of reception active circuits includes at least a reception amplifier circuit and a first reception active circuit,
wherein:
the reception circuit device is laid out so that a combined length of transmission lines connecting circuit members, which includes at least a first circuit member and a second circuit member, in a first block circuit between an output terminal of the antenna and an input terminal of the reception amplifier circuit placed at an immediately-following-stage of the antenna is shorter than a combined length of transmission lines connecting between an output terminal of the reception amplifier circuit at the immediately-following-stage of the antenna and an input terminal of the first reception active circuit at a following-stage of the reception amplifier circuit.

13. The wireless communications apparatus as set forth in claim 8, wherein,
the antenna is a linear antenna.

14. The wireless communications apparatus as set forth in claim 8, wherein,
the combined lengths of the transmission lines are represented by high-frequency transmission loss.

15. The wireless communications apparatus as set forth in claim 12, wherein,
the first reception active circuit is made up of either an intermediate frequency circuit or a modulation/demodulation circuit, and a wireless frequency input-output circuit which are provided on a single package or on a single chip.

16. The wireless communications apparatus as set forth in claim 12, wherein:
the reception amplifier circuit is a low-noise amplifier.

17. The wireless communications apparatus as set forth in claim 12, wherein,
the reception circuit device is laid out so that a part or entire of the first block circuit is formed on a substrate different from a substrate on which the first reception active circuit is formed.

18. The wireless communications apparatus as set forth in claim 12, wherein,
the reception circuit device is laid out so that a part or entire of the first block circuit is formed as one circuit group different from a circuit group in which the first reception active circuit at the following-stage of the reception amplifier active circuit at the immediately-following-stage of the antenna is formed.

19. The wireless communications apparatus as set forth in claim 12, wherein,
the antenna is a linear antenna.

20. The wireless communications apparatus as set forth in claim 12, wherein,
the combined lengths of the transmission lines are represented by high-frequency transmission loss.

21. A wireless communications apparatus, comprising:
a reception circuit device including an antenna and a reception active circuit block made up of a plurality of active circuits, wherein the plurality of active circuits includes at least a final-stage reception amplifier circuit and a second-stage reception active circuit placed at an immediately-following-stage of the first-stage reception amplifier circuit,
wherein:
the reception circuit device is laid out so that a combined length of transmission lines connecting circuit members, which include at least a first circuit member and a second circuit member, in a first block circuit between an output terminal of the antenna and an input terminal of the reception active circuit block is shorter than a combined length of transmission lines connecting between an output terminal of the first-stage reception amplifier circuit and an input terminal of the second-stage reception active circuit in the reception active circuit block.

22. The wireless communications apparatus as set forth in claim 21, wherein:
the reception amplifier circuit is a low-noise amplifier.

23. The wireless communications apparatus as set forth in claim 21, wherein,
the plurality of active circuits further includes a second reception active circuit at a following stage of the reception active circuit block,
the reception circuit device is laid out so that a part or entire of the first block circuit is formed on a substrate different from a substrate on which the second reception active circuit is formed.

24. The wireless communications apparatus as set forth in claim 21, wherein,
the plurality of active circuits further includes a second reception active circuit at a following stage of the reception active circuit block,
the reception circuit device is laid out so that a part or entire of the first block circuit is formed as one circuit group different from a circuit group in which the second reception active circuit is formed.

25. The wireless communications apparatus as set forth in claim 21, wherein,
the antenna is a linear antenna.

26. The wireless communications apparatus as set forth in claim 21, wherein,
the combined lengths of the transmission lines are represented by high-frequency transmission loss.

27. A wireless communications apparatus, comprising:
a transmission circuit device including an antenna and a plurality of transmission active circuits, wherein the plurality of transmission active circuits includes at least a transmission amplifier circuit and a first active circuit; and
a reception circuit device including the antenna and a plurality of reception active circuits, wherein the plurality of reception active circuits include at least a reception amplifier circuit and the first active circuit,
wherein:
the transmission circuit device is laid out so that a combined length of transmission lines connecting circuit members, which include at least a first circuit member and a second circuit member, in a first block circuit between an output terminal of the transmission amplifier circuit placed at an immediately-preceding-stage of the antenna and an input terminal of the antenna is shorter than a combined length of transmission lines connecting between an input terminal of the transmission amplifier circuit at the immediately-preceding-stage of the antenna and an output terminal of the first active circuit at a preceding-stage of the transmission amplifier circuit; and
the reception circuit device is laid out so that a combined length of transmission lines connecting the circuit members, which include at least the first circuit member and the second circuit member, in the first block circuit between an output terminal of the antenna and an input terminal of the reception amplifier circuit placed at an immediately-following-stage of the antenna is shorter than a combined length of transmission lines connecting between an output terminal of the reception amplifier circuit at the immediately-following-stage of the antenna and an input terminal of the first active circuit at a following-stage of the reception amplifier circuit.

28. The wireless communications apparatus as set forth in claim 27, wherein,
the first active circuit is made up of either an intermediate frequency circuit or a modulation/demodulation circuit, and a wireless frequency input-output circuit which are provided on a single package or on a single chip.

29. The wireless communications apparatus as set forth in claim 27, wherein,
the antenna is a linear antenna.

30. The wireless communications apparatus as set forth in claim 27, wherein,
the combined lengths of the transmission lines are represented by high-frequency transmission loss.

31. A wireless communications apparatus, comprising:
a transmission circuit device including an antenna and a transmission active circuit block made up of a plurality of active circuits, wherein the plurality of active circuits includes at least a final-stage transmission amplifier circuit and a next-to-last-stage transmission active circuit and a next-to-last-stage transmission active circuit placed at an immediately-preceding-stage of the final-stage transmission amplifier circuit; and a reception circuit device including the antenna and a reception active circuit block made up of a plurality of active circuits, wherein the plurality of active circuits includes at least a first-stage reception amplifier circuit and a second-stage reception active circuit placed at an immediately-following-stage of the first-stage reception amplifier circuit, wherein:

the transmission circuit device is laid out so that a combined length of transmission lines connecting circuit members, which include at least a first circuit member and a second circuit member, in a first block circuit between an output terminal the transmission active circuit block and an input terminal of the antenna is shorter than a combined length of transmission lines connecting between an input terminal of the final-stage transmission amplifier circuit and an output terminal of the next-to-last-stage transmission active circuit; and the reception circuit device is laid out so that a combined length of transmission lines connecting the circuit members, which include at least the first circuit member and the second circuit member, in the first block circuit between an output terminal of the antenna and an input terminal of the reception active circuit block is shorter than a combined length of transmission lines connection between an output terminal of the first-stage active circuit and an input terminal of the second-stage reception active circuit in the reception active circuit block.

32. The wireless communications apparatus as set forth in claim 31, wherein, the antenna is a linear antenna.

33. The wireless communications apparatus as set forth in claim 31, wherein, the combined lengths of the transmission lines are represented by high-frequency transmission loss.

34. A wireless communications apparatus, comprising:

a transmission circuit device including an antenna and a plurality of transmission active circuits, wherein the plurality of transmission active circuits includes at least a transmission amplifier circuit, and a first transmission active circuit; and a reception circuit device including the antenna and a plurality of reception active circuits, wherein the plurality of reception active circuits includes at least a reception amplifier circuit, and a first reception active circuit, wherein:

the transmission circuit device is laid out so that a combined length of transmission lines connecting circuit members which include at least a first circuit member and a second circuit member, in a first block circuit between an output terminal of the transmission amplifier circuit placed at an immediately-preceding-stage of the antenna and an input terminal of the antenna is shorter than a combined length of transmission lines connecting between an input terminal of the transmission amplifier circuit and an output terminal of the first transmission active circuit at a preceding-stage of the transmission amplifier circuit; and a part or entire of the first block circuit is formed on a substrate different from a substrate on which the first transmission active circuit is formed, and the reception circuit device is laid out so that a combined length of transmission lines connecting the circuit members, which include at least the first circuit member and the second circuit member, in the first block circuit between an output terminal of the antenna and an input terminal of the reception amplifier circuit placed at an immediately-following-stage of the antenna is shorter than a combined length of transmission lines connecting between an output terminal of the reception amplifier circuit at the immediately-following-stage of the antenna and an input terminal of the first reception active circuit at a following-stage of the reception amplifier circuit at the immediately-following-stage of the antenna; and a part or entire of the first block circuit is formed on a substrate different from a substrate on which the first reception active circuit is formed.

35. A wireless communications apparatus, comprising:

a transmission circuit device including an antenna and a plurality of transmission active circuits, wherein the plurality of transmission active circuits includes at least a transmission amplifier circuit, and a first transmission active circuit; and a reception circuit device including the antenna and a plurality of reception active circuits, wherein the plurality of reception active circuits includes at least a reception amplifier circuit, and a first reception active circuit, wherein:

the transmission circuit device is laid out so that a combined length of transmission lines connecting circuit members, which include at least a first circuit member and a second circuit member, in a first block circuit between an output terminal of the transmission amplifier circuit placed at an immediately-preceding-stage of the antenna and an input terminal of the antenna is shorter than a combined length of transmission lines connecting between an input terminal of the transmission amplifier circuit at the immediately-preceding-stage of the antenna and an output terminal of the first transmission active circuit at a preceding-stage of the transmission amplifier circuit; and a part or entire of the first block circuit from the transmission amplifier circuit at the immediately-preceding stage of the antenna to the antenna, which part or entire of the first block includes at least the first circuit member and the second circuit member is formed as one circuit group different from a circuit group in which the first transmission active circuit at the preceding-stage of the transmission amplifier circuit at the immediately-preceding-stage of the antenna is formed, and the reception circuit device is laid out so that a combined length of transmission lines connecting the circuit members, which include at least the first circuit member and the second circuit member, in the first block circuit between an output terminal of the antenna and an input terminal of the reception amplifier circuit placed at an immediately-following-stage of the antenna is shorter than a combined length of transmission lines connecting between an output terminal of the reception amplifier circuit at the immediately-following-stage of the antenna and an input terminal of the first reception active circuit at a following-stage of the reception amplifier circuit at the immediately-following-stage of the antenna; and a part or entire of the first block circuit from the antenna to the reception amplifier circuit at the immediately-following stage of the antenna are formed as one circuit block different from a circuit block in which the first reception active circuit at the following-stage of the reception amplifier circuit at the immediately-following-stage of the antenna is formed.

* * * * *